No. 866,802. PATENTED SEPT. 24, 1907.
J. NEULANDER.
CALENDAR.
APPLICATION FILED JAN. 17, 1907.
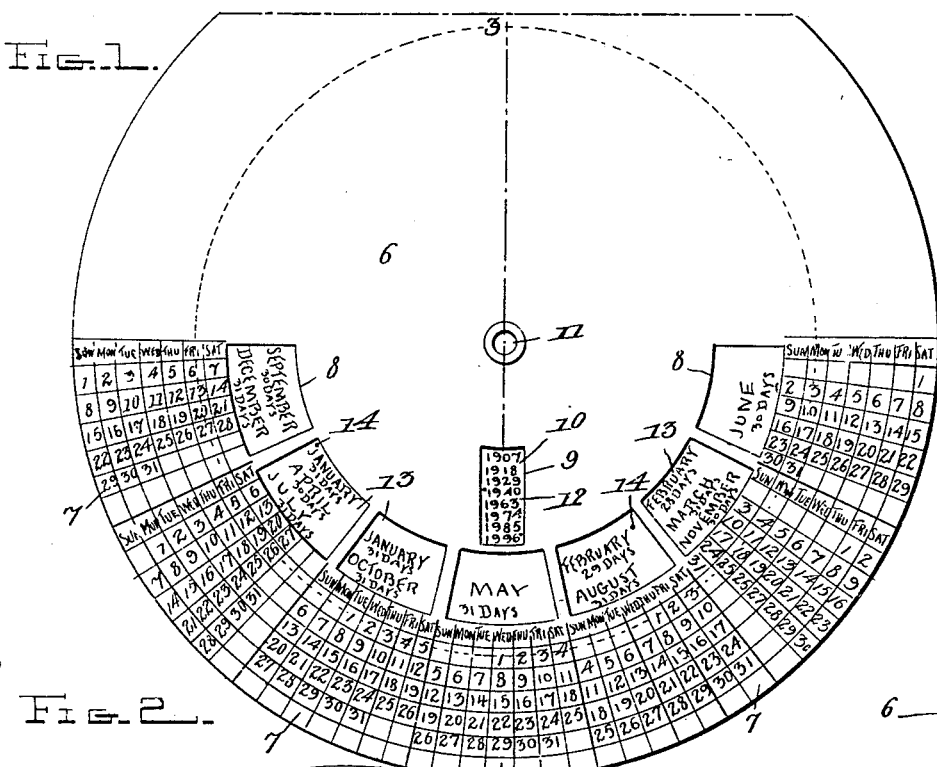
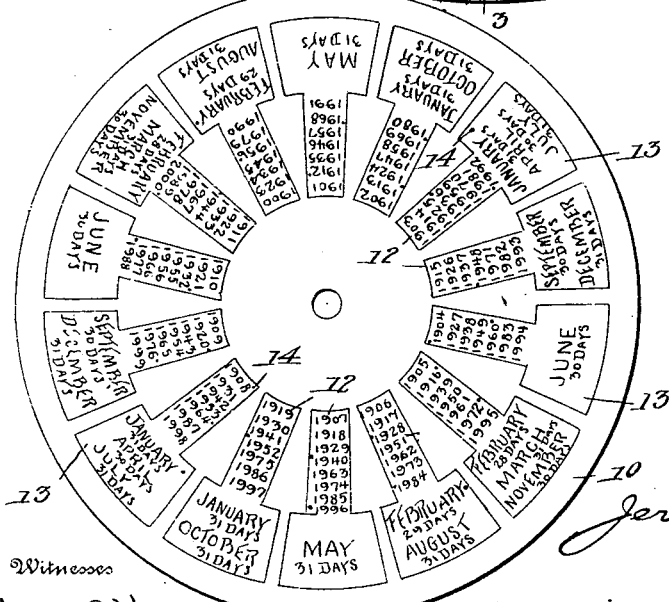
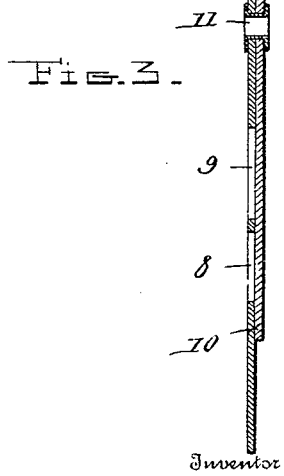
Inventor
Jerome Neulander.
Witnesses
By
Attorneys

UNITED STATES PATENT OFFICE.

JEROME NEULANDER, OF CLEVELAND, OHIO.

CALENDAR.

No. 866,802.  Specification of Letters Patent.  Patented Sept. 24, 1907.

Application filed January 17, 1907. Serial No. 352,773.

*To all whom it may concern:*

Be it known that I, JEROME NEULANDER, a subject of Emperor Franz Joseph of Austria-Hungary, residing at Cleveland, in the county of Cuyahoga and State of Ohio, have invented certain new and useful Improvements in Calendars, of which the following is a specification.

This invention is a calendar, capable of use for at least one-hundred years, and has for its object to provide a simple arrangement whereby the relative day of the month or the week may be found for any date within the century.

The device comprises a pair of disks which are movable with respect to each other to bring the table of months opposite the appropriate tables of the weeks, for the purpose stated.

The invention is illustrated in the accompanying drawings, in which

Figure 1 is a face view of the device. Fig. 2 is a face view of the lower disk. Fig. 3 is a cross section on the line 3—3 of Fig. 1.

Referring specifically to the drawings, 6 indicates an upper disk or plate which is provided around the edge of its lower half with a row of seven tables 7, containing the days of the weeks and the dates of the months. There is one row beginning with each day of the week. Thus one row starts with Sunday the 1st, the next with Monday the 1st, and so on. The disk also has, adjacent to said tables, a series of openings 8 corresponding in number and position to the respective tables 7, through which openings the names of the months are disclosed, and adjacent the openings 8 in the disk there is an opening 9, for the years.

The lower disk 10 is pivotally connected at 11 to the upper disk so as to turn thereunder, and the central portion of the lower disk is provided with radial rows 12 of the year figures, amounting to one-hundred years, and each row contains the years in which January 1st falls on the same day of the week. Each of these rows may be exposed through the opening 9 by turning the lower disk to proper position.

The outer or disk portion of the rim of the lower disk contains the names of the months as indicated at 13, and these are arranged in classes or sets so that when the 1st of January falls on a certain day of the week, the other months will appear or be arranged to show through the openings 8 above the appropriate table 7 according to the first days of such other months. Leap years are arranged for by indexed months or years, as indicated at 14.

The names 13 of the months are so arranged upon the rim of the lower disk 10 that the names of twelve months will always be exposed through the openings 8, as well as additional names of January and February for leap years, and the arrangement of the rows 12 of the years is such that the months of said years will be properly exposed with respect to the initial days of said months as indicated by the tables 7 of the days of the week.

To set the calendar, or to find any desired day of the week or month, it is only necessary to turn the lower disk until the proper year is exposed through the opening 9. Then it will be found that the names of the months will be exposed through the openings 8 above the suitable and proper tables of the days of the months, forming a complete calendar for that year and enabling any desired day or date to be readily ascertained.

I claim:

1. A calendar comprising an upper disk having a series of openings therein in one part thereof, and a single opening in another part thereof, and also having a table of the days of the months and weeks arranged in columns extending respectively from each of said series of openings, and a relatively movable disk having thereon a series of rows of years any row of which may be exposed through said single opening, and also having thereon the names of the months arranged in groups and adapted to be exposed through said series of openings.

2. A calendar comprising an upper disk having a series of openings arranged in a semi-circle in the lower part thereof, and a single opening therein and also having tables of the days of the months and weeks extending from said series of openings respectively, and a relatively rotatable lower disk having thereon a series of rows of years arranged radially, any row of which may be exposed through said single opening, and also having thereon the names of the months arranged in groups in a circle and adapted to be exposed through said series of openings.

In testimony whereof I have affixed my signature, in presence of two witnesses.

JEROME NEULANDER.

Witnesses:
JOHN A. BOMMHARDT,
EDITH D. COMER.